US012013664B2

(12) United States Patent
Dos Santos Predrosa et al.

(10) Patent No.: US 12,013,664 B2
(45) Date of Patent: Jun. 18, 2024

(54) BEZEL FOR TIMEPIECE CASE

(71) Applicant: ROLEX SA, Geneva (CH)

(72) Inventors: Pedro Manuel Dos Santos Predrosa, Satigny (CH); Frédéric Mossière, Cercier (FR); Jean-Baptiste Robin, Annemasse (FR)

(73) Assignee: ROLEX SA, Geneva (CH)

( * ) Notice: Subject to any disclaimer, the term of this patent is extended or adjusted under 35 U.S.C. 154(b) by 545 days.

(21) Appl. No.: 17/087,450

(22) Filed: Nov. 2, 2020

(65) Prior Publication Data

US 2021/0132544 A1 May 6, 2021

(30) Foreign Application Priority Data

Nov. 5, 2019 (EP) .................................... 19207278

(51) Int. Cl.

*G04B 19/28* (2006.01)
*G04B 37/22* (2006.01)
*G04B 45/00* (2006.01)

(52) U.S. Cl.

CPC ........... *G04B 19/283* (2013.01); *G04B 37/22* (2013.01); *G04B 45/00* (2013.01); *G04B 19/28* (2013.01)

(58) Field of Classification Search

CPC ...... G04B 19/283; G04B 37/22; G04B 45/00; G04B 19/28; G04B 19/223; G04B 37/221; G04B 37/223; G04B 37/225; G04B 37/226; G04B 37/228

See application file for complete search history.

(56) References Cited

U.S. PATENT DOCUMENTS

| | | | | |
|---|---|---|---|---|
| 6,616,329 B1 * | 9/2003 | Sasaki | G04B 19/283 368/300 |
| 7,182,508 B2 | 2/2007 | Bertrand et al. | |
| 7,413,339 B2 * | 8/2008 | Damasko | G04B 19/283 368/294 |
| 9,256,208 B2 | 2/2016 | Hiranuma et al. | |
| 2005/0007890 A1 * | 1/2005 | Bertrand | G04B 19/28 368/294 |
| 2015/0085627 A1 | 3/2015 | Hiranuma et al. | |

(Continued)

FOREIGN PATENT DOCUMENTS

| | | |
|---|---|---|
| CH | 631593G A3 | 8/1982 |
| CH | 709739 A2 | 12/2015 |

(Continued)

OTHER PUBLICATIONS

European Search Report and Written Opinion dated Apr. 30, 2020 in counterpart application No. EP19207278; with English machine translation (total 17 pages).

(Continued)

*Primary Examiner* — Edwin A. Leon
*Assistant Examiner* — Sean R Brannon
(74) *Attorney, Agent, or Firm* — Seckel IP, PLLC

(57) ABSTRACT

Bezel (10) for the case (100) of a timepiece (200), having an axis (A1), a first component (1) including a first surface (1*a*), and a second component (2) including a second surface (2*a*), the first and second surfaces being positioned at least substantially facing and/or at least substantially perpendicular to the axis (A1), the first and second surfaces being intended to interact by blocking with the axial retaining element (4) positioned on a middle (6).

20 Claims, 4 Drawing Sheets

(56) References Cited

U.S. PATENT DOCUMENTS

| | | | | |
|---|---|---|---|---|
| 2015/0092524 | A1* | 4/2015 | Verdon | B44C 3/10<br>368/285 |
| 2019/0294114 | A1* | 9/2019 | Silvant | G04B 19/286 |

FOREIGN PATENT DOCUMENTS

| | | | |
|---|---|---|---|
| DE | 1948628 | A1 | 6/1970 |
| DE | 202005003029 | U1 | 10/2005 |
| EP | 1416341 | A2 | 5/2004 |
| GB | 1286120 | A | 8/1972 |
| WO | 0017715 | A1 | 3/2000 |

OTHER PUBLICATIONS

Chinese Office Action and Search Report dated Dec. 25, 2023 in counterpart application No. CN202011218898.1; with machine translation (total 10 pages) (note: US20190294114 and US20150092524, D2 and D3 cited in the CN Office Action, D5 and D2 in the CN Search Report, are not listed in this IDS since they are already of record in this application).

* cited by examiner

BEZEL FOR TIMEPIECE CASE

This application claims priority of European patent application No. EP19207278.3 filed Nov. 5, 2019, the content of which is hereby incorporated by reference herein in its entirety.

The invention relates to a bezel for a timepiece case. The invention also relates to a timepiece case comprising such a bezel. The invention further relates to a timepiece comprising such a bezel. Finally, the invention relates to a method for assembling a timepiece case or a timepiece.

The prior art discloses a large number of bezels for watch cases. These bezels may, for example, comprise a bezel ring to which is fixed a decorative and/or a display disk, and may be attached to a watch case middle by means of an axial retaining element designed to be fitted into a groove of said bezel ring.

Such designs are entirely satisfactory. However, they have the drawback of requiring a minimum thickness of the bezel ring for forming a groove therein to receive an axial retaining element. The thickness of the bezel is therefore at least partially dictated by its assembly function.

By way of example, patent application EP1416341 discloses a connection device between a bezel and a watch case middle using an axial retaining element that is designed to be fitted between two axial stop surfaces of a bezel in the form of a one-piece component. More particularly, this patent application relates to a specific geometry of an axial retaining element intended to facilitate the assembly and disassembly of the bezel.

By way of a further example, patent application EP2624076 discloses a watch case design including a bezel comprising a main bezel ring to which a decorative and/or a display disk is attached. This case design uses an axial retaining element as disclosed in patent application EP1416341, which is designed to be fitted between two axial stop surfaces of a main bezel ring to which a decorative and/or a display disk is attached. The two axial stop surfaces are formed by a groove machined in the main bezel ring. Such a groove requires a sufficient thickness of the bezel ring. Moreover, it is difficult to form such a groove in a bezel ring made of a hard and fragile material, notably a ceramic, due to the necessary manufacturing tolerances and the risk of wear of the tools used in the step of grinding such a groove.

The object of the invention is to provide a bezel for a timepiece case that can overcome the aforementioned drawbacks and to improve the bezels for timepiece cases known from the prior art. In particular, the invention proposes a bezel for a timepiece case that is simpler to use and that can be made wholly or virtually wholly of a fragile material, notably ceramic.

A bezel for a timepiece case according to the invention is defined by point 1 below.

Different embodiments of the bezel are defined by points 2 to 9 below.

A timepiece case according to the invention is defined by points 10 or 14 below.

An embodiment of a timepiece case is defined by point 11 below.

A timepiece according to the invention is defined by points 12 or 15 below.

A method for assembling a timepiece case or a timepiece is defined by point 13 below.

1. A bezel for a case of a timepiece, the bezel comprising:
   - an axis,
   - a first component including a first surface, and

- a second component including a second surface, the first and second surfaces being positioned at least substantially facing and/or at least substantially perpendicular to the axis, the first and second surfaces being intended to interact by blocking with an axial retaining element positioned on a middle.

2. The bezel as defined in point 1, wherein the first and second surfaces are sides of a groove formed in the bezel.

3. The bezel as defined in point 2, wherein the bottom of the groove is formed by a third surface of the first component and/or by a fourth surface of the second component.

4. The bezel as defined in any of the preceding points, wherein the first component is a main bezel ring or a lower bezel ring.

5. The bezel as defined in any of the preceding points, wherein the second component is a decorative and/or a display ring of a bezel or wherein the second component is an intermediate ring mounted between:
   - a main bezel ring or a lower bezel ring, and
   - a decorative and/or a display ring of a bezel.

6. The bezel as defined in any of the preceding points, wherein the second component is retained by clipping relative to the first component or is positioned with minimum clearance on the first component.

7. The bezel as defined in any of the preceding points, wherein the first component is made of a first material, notably a first ceramic, and wherein the second component or a decorative and/or a display ring of the bezel is made of a second material, notably a second ceramic.

8. The bezel as defined in any of the preceding points, wherein the first component is made of:
   - a ceramic mainly or predominantly composed of zirconia,
   - a ceramic mainly or predominantly composed of alumina,
   - a ceramic mainly or predominantly composed of zirconium oxide or silicon nitride,
   - a ceramic mainly or predominantly composed of boron carbide or aluminum nitride,
   - a composite, notably an alumina-zirconia composite (ZTA/ATZ) or cermet,
   - a metal, notably a metal alloy such as a steel, or a precious metal alloy based on gold or platinum, and/or wherein the second component or a decorative and/or a display ring of a bezel is made of:
   - a ceramic mainly or predominantly composed of zirconia,
   - a ceramic mainly or predominantly composed of alumina,
   - a ceramic mainly or predominantly composed of zirconium oxide or silicon nitride,
   - a ceramic mainly or predominantly composed of boron carbide or aluminum nitride,
   - a composite, notably an alumina-zirconia composite (ZTA/ATZ) or cermet,
   - a metal, notably a metal alloy such as an aluminum-based alloy, a steel, or a precious metal alloy based on gold or platinum.

9. The bezel as defined in any of the preceding points, wherein the bezel is of the rotating type.

10. A timepiece case comprising a middle, an axial retaining element, and a bezel as defined in any of points 1 to 9.

11. The timepiece case as defined in the preceding point, wherein the axial retaining element is a shearable element.

12. A timepiece, notably a watch, particularly a wristwatch, comprising a case as defined in point 10 or 11 or a bezel as defined in any of points 1 to 9.

13. A method for assembling a timepiece case or a timepiece, comprising at least the following steps:
   - positioning a first component of a bezel on a middle, then positioning an axial retaining element on the middle, then
positioning a second component of a bezel on the first component of a bezel or positioning a second component of a bezel on a first component of a bezel,
positioning an axial retaining element between the first and second components, then
positioning the assembly formed by the first component, second component and retaining element on a middle.

14. A timepiece case produced by applying the method as defined in the preceding point.

15. A timepiece produced by applying the method as defined in point 13.

The attached drawings show, by way of example, two embodiments of a timepiece according to the invention.

Figure 1:
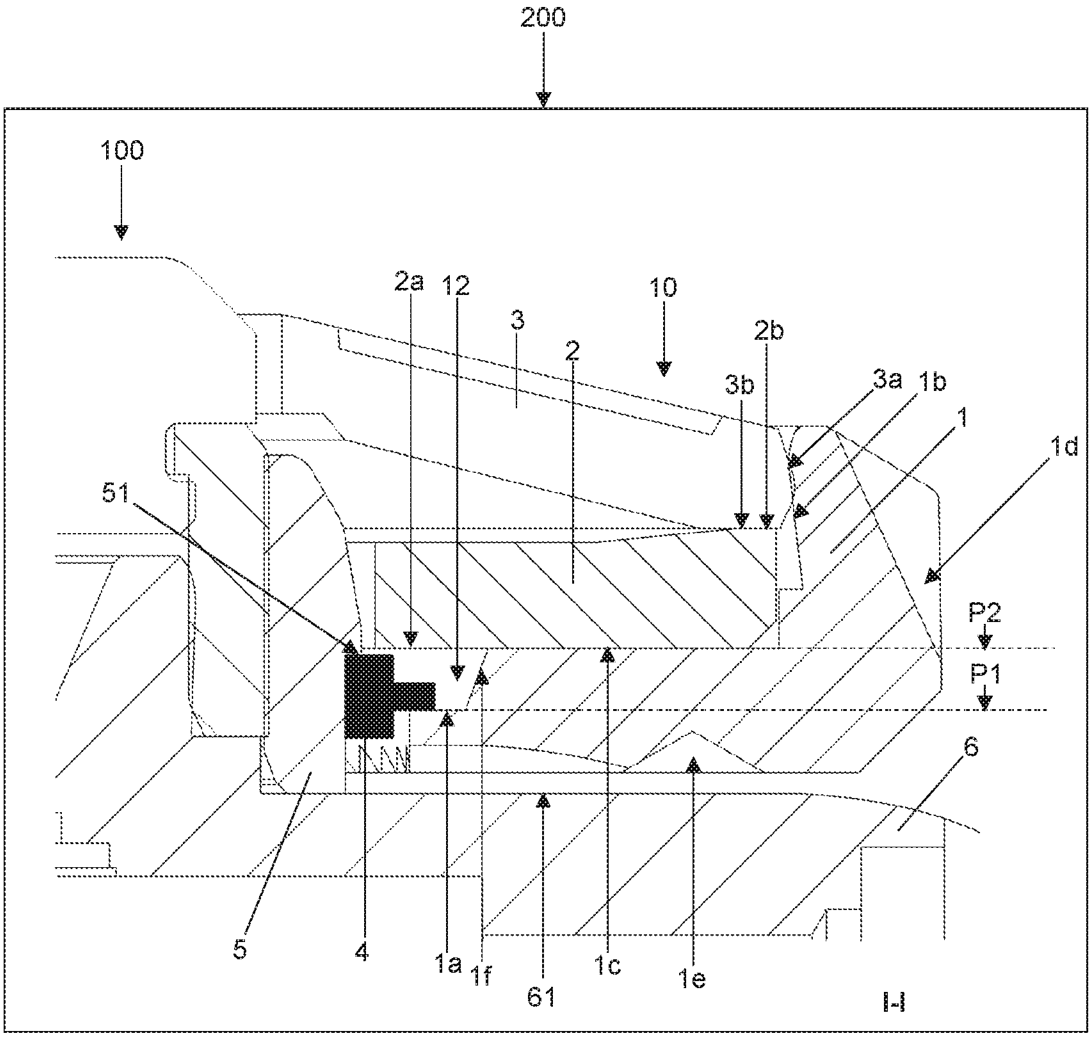
FIG. 1 is a partial sectional view taken along a first plane I-I of a first embodiment of a timepiece.
Figure 2:
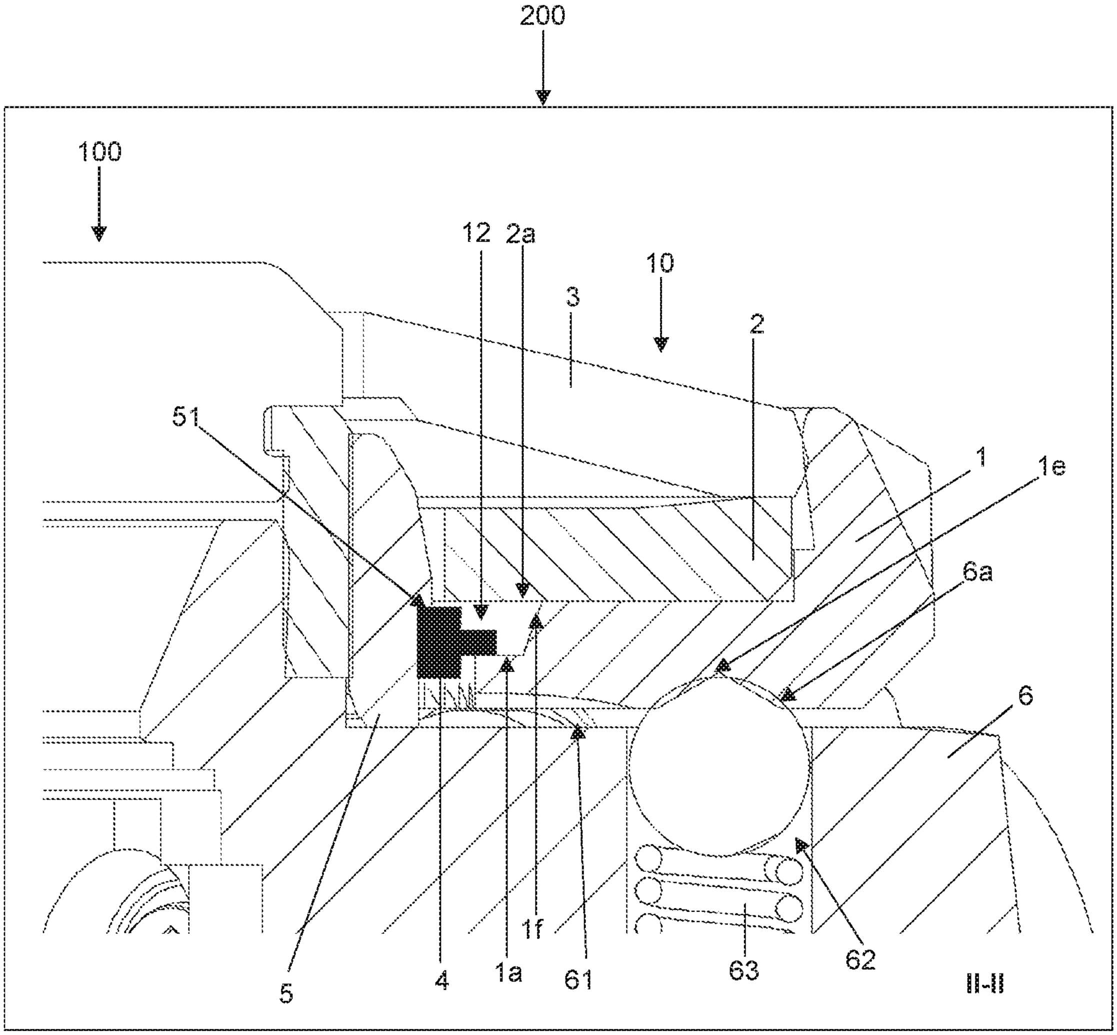
FIG. 2 is a partial sectional view taken along a second plane II-II of the first embodiment.
Figure 3:
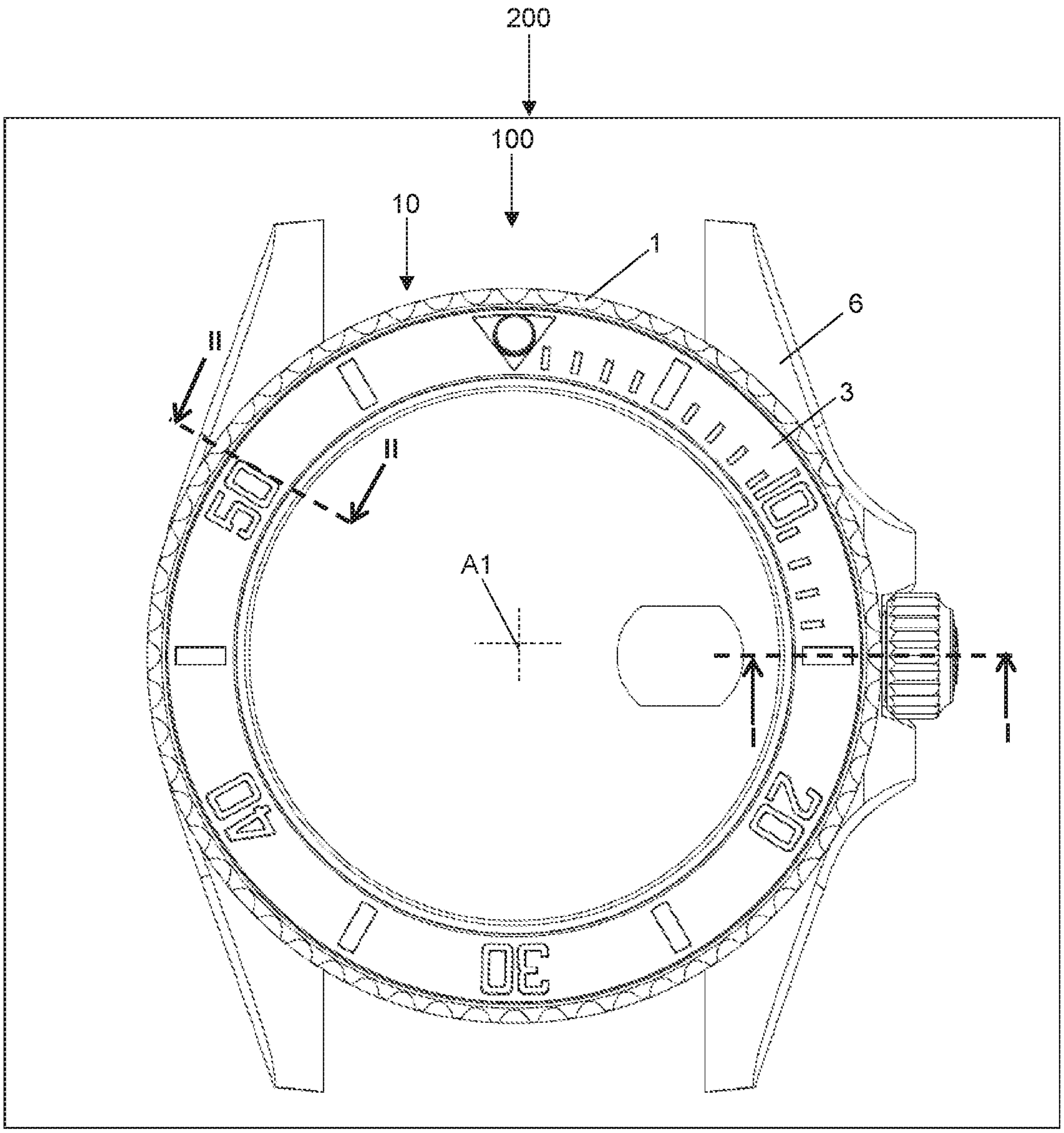
FIG. 3 is a front view of the first embodiment.

A first embodiment of a timepiece 200 is described below with reference to FIGS. 1 to 3.

The timepiece is, for example, a watch, particularly a wristwatch.

The timepiece preferably comprises a timepiece case 100. The timepiece further comprises a timepiece movement. The timepiece movement is intended to be mounted in the watch case to protect it from the external environment.

The timepiece movement may be an electronic movement or a mechanical movement, notably an automatic movement.

The watch case 100 preferably comprises a middle 6 and a bezel 10. The watch case 100 also preferably comprises a back attached to the middle and a glass attached to the middle.

The bezel may be mounted in a fixed way on the middle. Alternatively, the bezel may be a rotating bezel, that is to say one that is mounted movably in rotation on the middle 6 about an axis A1. The axis A1 may be an axis of the bezel. The axis A1 may be an axis of revolution of the bezel or substantially an axis of revolution of the bezel. Preferably, the axis A1 is an axis common to the bezel and the middle. In the embodiments described and shown, the bezel is a rotating bezel.

The watch case may comprise an element 4 for axially retaining the bezel on the middle, that is to say an element for retaining the bezel in the direction of the axis A1. This axial retaining element is, for example, a ring 4 having a T-shaped radial section, with:

first and second branches of the T parallel to the axis A1 and aligned, and
a third branch of the T perpendicular to the axis A1 and extending radially outward (relative to the axis A1) from the first and second branches.

Preferably, the axial retaining element 4 is a shearable element. For example, the element may be broken at the base of the third branch, when sufficient axial force is exerted on this third branch.

Alternatively, the ring may have an L-shaped radial section, with:

a first branch of the L parallel to the axis A1, and
a second branch of the L perpendicular to the axis A1 and extending radially outward (relative to the axis A1) from the first branch.

Preferably, the axial retaining element is a shearable element. For example, the element may be broken at the base of the second branch, when sufficient axial force is exerted on this second branch.

Also alternatively, the ring may have a rectangular section comprising an area of lower resistance to shearing, by using a groove or a slot, for example.

The axial retaining element 4 is, for example, mounted on a ring 5, which is itself attached, for example by being driven onto the middle 6. This ring 5 advantageously has a seat 51 against which the axial retaining element 4 bears. This seat 51 therefore prevents the axial retaining element 4 from being moved in translation along the axis A1 toward the glass.

The bezel may comprise grip elements 1*d* if the bezel 10 is mounted pivotably or rotatably on the middle 6 of the watch case 100. Optionally, it may also comprise first angular notching and/or indexing elements 1*e* designed to interact with second angular notching and/or indexing means 6*a* positioned on the middle 6, notably on an annular seat 61 of the middle 6, as shown in FIG. 2.

The first angular notching and/or indexing elements may, for example, comprise recesses 1*e* distributed regularly under the bezel around the axis A1.

The second angular notching and/or indexing elements may comprise a ball 6*a* positioned in a bore 62 in the middle. The ball is biased into the position of contact with the bezel by a resilient element, notably a coil spring 63.

The bezel 10 for the case 100 of a timepiece 200 comprises:

the axis A1 of rotation and/or of revolution,
a first component 1 including a first surface 1*a*, and
a second component 2 including a second surface 2*a*. The first and second surfaces are positioned at least substantially facing one another, and/or are at least substantially perpendicular to the axis A1.

The first and second surfaces are intended to interact by blocking with the axial retaining element 4 positioned on the middle 6. Thus the first surface 1*a* is preferably biased to bear against the axial retaining element 4. The contact between the first surface 1*a* and the axial retaining element prevents the bezel from moving axially toward the glass.

The contact between the second surface 2*a* and the axial retaining element 4 prevents the bezel from moving axially toward the back. Preferably, this contact prevents the bezel from rubbing on the seat 61 of the middle.

The first component is, for example, a main bezel ring or a lower bezel ring. The radial section of the first component may have an L-shaped geometry with a first branch extending perpendicularly or substantially perpendicularly to the axis A1 and a second branch extending parallel or substantially parallel to the axis A1, toward the glass relative to the first branch. The first branch is intended to face the seat 61 of the middle 6. The first branch comprises the first notching and/or indexing elements. The first branch further comprises a surface 1*c* extending preferably perpendicularly to the axis A1. The first branch also comprises a seat 1*f* on its inner edge, the seat 1*f* delimiting the first surface 1*a*. The second branch comprises the grip elements 1*d*.

The second component is, for example, an intermediate ring 2 mounted between:

the main bezel ring, and
a decorative and/or a display ring 3 of a bezel.

The second component preferably comprises parallel or substantially parallel surfaces. The second component extends, for example, perpendicularly to the axis A1 or substantially perpendicularly to the axis A1. It comprises, notably, parallel or substantially parallel surfaces 2*a* and 2*b*, which extend, for example, perpendicularly to the axis A1 or substantially perpendicularly to the axis A1.

The second surface 2*a* and the surface 1*c* are configured and/or arranged to bear against one another.

The decorative and/or display ring 3 of the bezel comprises, on an upper surface, decorations and/or indications, notably indications intended to interact with an indicator and/or other indications on a dial of the timepiece. The decorative and/or display ring 3 extends overall along a tapered surface with an axis A1. Alternatively, it may extend along a substantially flat surface perpendicular to the axis A1. The decorative and/or display ring 3 may be a decorative and/or a display disk 3.

The first and second surfaces 1*a* and 2*a* constitute the sides of a groove 12 formed in the bezel, notably a groove at the interface of the first and second components. The shoulder if forms a third surface at the bottom of the groove.

The second component forms a disassembly ring 2 for the decorative and/or display ring 3 which is configured and/or arranged to be positioned on the first component 1. This disassembly ring 2 is fitted in advance with minimum clearance into the first component 1 before the operation of driving on the decorative and/or display ring 3, so as to form an interface between the first component 1 and the decorative and/or display ring 3, particularly along a direction parallel or substantially parallel to the axis A1. The decorative and/or display ring 3 is then driven into a wall 1*b* of the first component 1 at an outer peripheral surface 3*a* of the decorative and/or display ring 3. Preferably, this wall is a tapered surface with an axis A1. When the decorative and/or display ring 3 has been assembled, a surface 3*b* of the decorative and/or display ring 3 bears on a surface 2*b* of the disassembly ring 2, which itself rests on the surface 1*c* of the first component 1 by means of its surface 2*a*.

Thus the second component is held by clipping or driving relative to the first component. In this case, the clipping or driving is indirect: it is the clipping or driving of the decorative and/or display ring 3 into the first component 1 that enables the second component to be retained. In other words, the second component is positioned with minimum clearance or confined between the first component 1 and the decorative and/or display ring 3.

When the constituent components of the bezel 10 have been assembled, the first surface 1*a* is positioned on a first plane P1, while the second surface 2*a*, positioned at the same level as the surface 1*c*, is positioned on a second plane P2. Thus the first and second surfaces 1*a* and 2*a* define a groove or a housing 12, axially delimited by the planes P1 and P2, into which, on the one hand, the axial retaining element 4 may be fitted to enable the bezel 10 to be assembled onto the middle 6, and, on the other hand, a disassembly tool may be inserted to enable the decorative and/or display ring 3 of first component 1 to be extracted when the bezel 10 has been disassembled from the case 100, notably by exerting forces to separate the first and second surfaces.

Such a design is particularly advantageous for the production of a bezel 10 having a decorative and/or a display ring 3 made of a fragile material, notably a ceramic, because the extraction of the decorative and/or display ring 3 takes place without direct contact between the tool and the decorative and/or display ring 3. Thus the risk of cracking the decorative and/or display ring 3 during the disassembly of the constituent elements of the bezel is greatly reduced or even eliminated.

The first component may be made of a first material, notably a ceramic, and the second component and/or the decorative and/or display ring 3 of the bezel may be made of a second material, notably a second ceramic.

The first component may, notably, be made of:

- a ceramic mainly or predominantly composed of zirconia,
- a ceramic mainly or predominantly composed of alumina,
- a ceramic mainly or predominantly composed of zirconium oxide or silicon nitride,
- a ceramic mainly or predominantly composed of boron carbide or aluminum nitride,
- a composite, notably an alumina-zirconia (ZTA/ATZ) composite or cermet.

Alternatively, the first component may be made of metal, notably a metallic alloy such as a steel or a precious metal alloy based on gold or platinum.

The decorative and/or display ring 3 may notably be made of:

- a ceramic mainly or predominantly composed of zirconia,
- a ceramic mainly or predominantly composed of alumina,
- a ceramic mainly or predominantly composed of zirconium oxide or silicon nitride,
- a ceramic mainly or predominantly composed of boron carbide or aluminum nitride,
- a composite, notably an alumina-zirconia (ZTA/ATZ) composite or cermet.

Alternatively, the decorative and/or display ring 3 may be made of metal, notably an aluminum-based alloy or a steel or a precious metal alloy based on gold or platinum.

Preferably, the second component may be made of metal, notably an aluminum- or brass-based alloy or a steel or a precious metal alloy such as a gold- or platinum-based alloy. Alternatively, the second component may be made of a composite material. Alternatively, the second component may be made of:

- a ceramic mainly or predominantly composed of zirconia,
- a ceramic mainly or predominantly composed of alumina,
- a ceramic mainly or predominantly composed of zirconium oxide or silicon nitride,
- a ceramic mainly or predominantly composed of boron carbide or aluminum nitride,
- a composite, notably an alumina-zirconia (ZTA/ATZ) composite or cermet.

As another alternative, the second component may be made of a polymeric material, notably a high-performance polymer such as a polymer belonging to the family of polyaryletherketones (PAEK), for example polyetherketone (PEEK).

Figure 4:
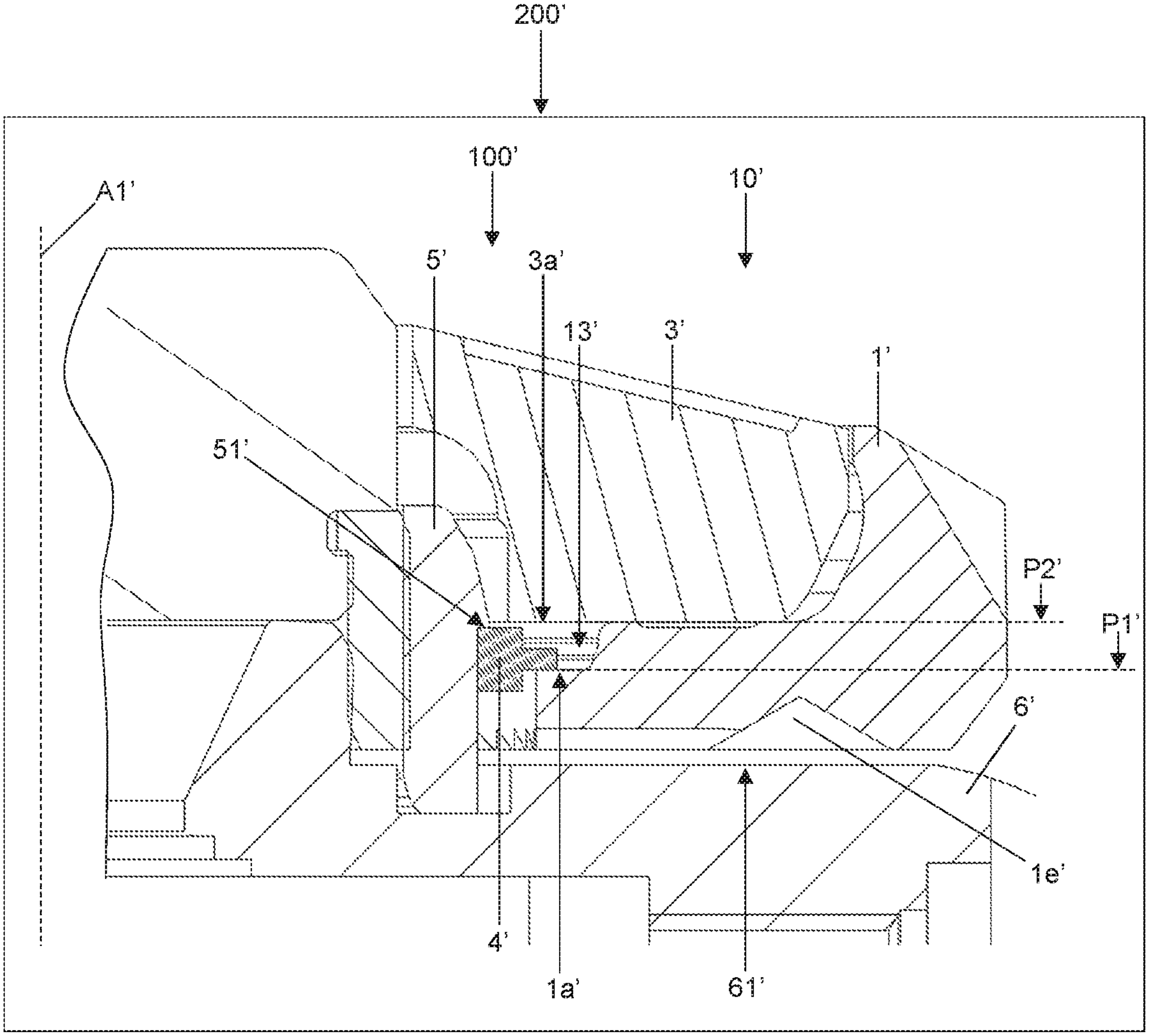
FIG. 4 is a partial sectional view of a second embodiment of a timepiece.

A second embodiment of a timepiece 200' is described below with reference to FIG. 4.

The timepiece is, for example, a watch, particularly a wristwatch.

The timepiece preferably comprises a timepiece case 100'. The timepiece further comprises a timepiece movement. The timepiece movement is intended to be mounted in the watch case to protect it from the external environment.

The timepiece movement may be an electronic movement or a mechanical movement, notably an automatic movement.

The watch case 100' preferably comprises a middle 6' and a bezel 10' having an axis A1'. The watch case 100' also preferably comprises a back attached to the middle and a glass attached to the middle.

The second embodiment differs, for example, from the first embodiment solely in that the bezel 10' has no intermediate ring and in that a decorative and/or a display ring 3' forms the second component and is fixed to the first component 1', by gluing for example. The respective surfaces 1*a'* and 3*a'* of the first component 1' and of the second component 3' extend along two distinct planes P1', P2' so as to form a housing 13' for receiving an axial retaining element 4'. The second component is therefore given the reference 3' in this embodiment.

Unless indicated otherwise, in this second embodiment, the reference of an element is deduced from the reference of an element of the first embodiment having the same structure or shape, or having the same function, with the addition of "'".

A mode of execution of a method for assembling a timepiece case 100; 100' or a timepiece 200; 200' is described below.

The method comprises at least the following steps:

positioning a first component 1; 1' of a bezel 10; 10' on a middle 6; 6', notably on a bezel seat 61; 61', then positioning an axial retaining element 4; 4' on the middle 6; 6', notably on a ring 5; 5' attached to the middle, then positioning a second component 2; 3' of a bezel 10; 10' on the first component 1; 1', of the bezel 10; 10'.

The retaining element may be positioned before or after the assembly of the ring 5; 5' onto the middle.

Alternatively, a method for assembling a timepiece case 100; 100' or a timepiece 200; 200' may comprise at least the following steps:

positioning a second component 2; 3' on a first component 1; 1', if appropriate, positioning a decorative and/or display ring 3 of a bezel on the first component 1, then positioning the axial retaining element 4; 4' between the first and second elements 1; 1' and 2; 3', then positioning the assembly formed in the preceding steps on a middle 6; 6'.

In the first embodiment, the decorative and/or display ring 3 is driven or clipped onto the first component after the second component has been positioned on the first component. In the second embodiment, the decorative and/or display ring 3' is glued onto the first component. Evidently, the decorative and/or display ring 3' could be fixed to the first component by clipping or driving, for example.

These modes of execution provide for the assembly of the constituent elements of the bezel directly onto the middle 6; 6', thereby offering greater flexibility in the assembly of the case 100; 100'.

The invention also relates to a timepiece case 100; 100' produced by applying the method as defined in the preceding paragraphs.

The invention also relates to a timepiece produced by applying the method described above.

Preferably, in the different embodiments and variants, the watch case comprises biasing elements biasing the bezel into contact with the axial retaining element 4. These biasing elements tend to move the bezel away from the seat 61 of the middle. These biasing elements may be of the resilient type. These biasing elements may comprise coil springs mounted in bores provided in the middle and opening at the seat of the middle.

Preferably, in the different embodiments and variants, the axial retaining element 4 is an annular retaining element as described in patent application EP1416341. Such an element allows easy disassembly of the bezel 10 from the middle 6 by the shearing of its portion that has the smallest cross section.

Advantageously, in the different embodiments and variants, the surfaces 1*a*, 1*c*, 2*a*, 2*b*, and 3*b* extend along planes that are perpendicular or substantially perpendicular to the axis A1 of revolution and/or rotation of the bezel 10.

Preferably, in the different embodiments and variants, the bezel is of the rotating or pivoting type. For example, in order to produce a fixed bezel, a watch case may be made according to any of the different embodiments and variants and means for locking the rotation of the bezel may be added to it. In this case, the notching and/or indexing elements are unnecessary.

In the different embodiments and variants, the first and second surfaces constitute the sides of a groove or a housing formed in the bezel, notably a groove or housing at the interface of the first and second components. A seat or a setback in the first element forms a third surface at the bottom of the groove. However, the bottom of the groove may alternatively be formed by a surface of the second component or by a surface formed on the first and second components. In other words, alternatively, a setback in the second component may form the groove or the housing, or two complementary setbacks in the first and second components may form the groove or the housing.

In the different embodiments and variants, the first component may be made of a first material, and the decorative and/or display ring 3, 3' of the bezel may be made of a second material. More precisely, the first component 1 may be made of a first ceramic, and the decorative and/or display ring 3, 3' may be made of a second ceramic. This first and/or second ceramic may be mainly or predominantly composed of zirconia. Alternatively, this first and/or second ceramic may be mainly or predominantly composed of alumina. Also alternatively, this first and/or second ceramic may be mainly or predominantly composed of zirconium oxide or silicon nitride. Also alternatively, this first and/or second ceramic may be mainly or predominantly composed of boron carbide or aluminum nitride.

In the different embodiments and variants, the first component 1 and/or the decorative and/or display ring 3, 3' may be made of a composite material. By way of example, this material may be an alumina-zirconia composite (ZTA/ATZ) or a cermet.

In the different embodiments and variants, the first component 1 and/or the decorative and/or display ring 3, 3' may be made of glass.

Generally, the first component 1 and the decorative and/or display ring 3, 3' may be made of different materials and/or have different coloring and/or have different terminations, so as to offer numerous combinations where the appearance of the bezel is concerned. Alternatively, the first component 1 and the decorative and/or display ring 3, 3' may be made of the same materials and/or have the same coloring and/or have the same termination.

In the solutions described above, the bezel comprises two axial stop surfaces designed to interact with an axial retaining element positioned on the middle of the watch case, these two surfaces each belonging to two distinct components of the bezel. Advantageously, a first axial stop surface may correspond to a surface of the main bezel ring. Also advantageously, a second axial stop surface may correspond to a surface of a disassembly ring of a decorative and/or a display disk of the bezel. Alternatively, a second axial stop surface may correspond to a surface of a decorative and/or display ring.

In other words, the two axial stop surfaces 1*a*, 2*a*; 1*a'*, 3*a'* are capable of interacting with at least one axial retaining element 4; 4', particularly an annular retaining element 4; 4' positioned on the middle of the watch case with the interposition of a ring 5, 5', these two surfaces each belonging to two distinct components 1; 1', 2; 3' of the bezel 10; 10'.

Such a design is particularly advantageous because of the simplicity of its application.

Such a design is also particularly advantageous for the production of a bezel having a first component 1; 1' made by conventional injection or replication methods. The absence of a groove within the first component 1; 1' makes it possible to dispense with further finishing steps which are difficult to carry out because of the geometry of such a groove, the manufacturing tolerances and the expected surface qualities. Thus the first component 1; 1' may, for example, be made of a non-metallic material, for example a ceramic.

Thus, the new bezel design makes it possible to produce a thinner bezel that can be assembled in a conventional way, using a tested method. Furthermore, this design advantageously makes it possible to offer an "all-ceramic" bezel which is provided with a bezel disk (for decoration and/or display) made of ceramic and a main bezel ring or a lower bezel ring made of ceramic.

Throughout this document, "radial section" is taken to mean a radial section relative to the axis A1, unless specified otherwise.

The invention claimed is:

1. A timepiece case, the timepiece case comprising a middle, an axial retaining element, and a bezel, the bezel comprising:

- an axis,
- a first component including a first surface, and
- a second component including a second surface,
- the first and second surfaces being positioned at least substantially facing each other and/or at least substantially perpendicular to the axis, the first and second surfaces being configured to interact by blocking with the axial retaining element positioned on the middle,
- wherein the second component has a contact surface configured to contact the axial retaining element, thereby preventing the bezel from rubbing on a seat of the middle.

2. The timepiece case as claimed in claim 1, wherein the first and second surfaces are sides of a groove formed in the bezel.

3. The timepiece case as claimed in claim 2, wherein a bottom of the groove is formed by a third surface of the first component and/or by a fourth surface of the second component.

4. The timepiece case as claimed in claim 1, wherein the first component is a main bezel ring or a lower bezel ring.

5. The timepiece case as claimed in claim 1, wherein the second component is a decorative ring and/or a display ring of the bezel.

6. The timepiece case as claimed in claim 1, wherein the second component is retained by clipping relative to the first component.

7. The timepiece case as claimed in claim 1, wherein the first component is made of a first material, and wherein the second component or a decorative ring and/or a display ring of the bezel is made of a second material different from the first material.

8. The timepiece case as claimed in claim 7, wherein the first component is made of a first ceramic, and wherein the second component or a decorative ring and/or a display ring of the bezel is made of a second ceramic different from the first ceramic.

9. The timepiece case as claimed in claim 7, wherein the first component is made of a first ceramic, and wherein the second component is made of a second ceramic different from the first ceramic.

10. The timepiece case as claimed in claim 1, wherein the first component consists of:

- a ceramic mainly composed of zirconia, or
- a ceramic mainly composed of alumina, or
- a ceramic mainly composed of zirconium oxide or silicon nitride, or
- a ceramic mainly composed of boron carbide or aluminum nitride, or
- a composite, or
- a metal.

11. The timepiece case as claimed in claim 10, wherein the second component or a decorative ring and/or a display ring of the bezel consists of:

- a ceramic mainly composed of zirconia, or
- a ceramic mainly composed of alumina, or
- a ceramic mainly composed of zirconium oxide or silicon nitride, or
- a ceramic mainly composed of boron carbide or aluminum nitride, or
- a composite, or
- a metal.

12. The timepiece case as claimed in claim 1, wherein the bezel rotatory.

13. The timepiece case as claimed in claim 1, wherein the axial retaining element is a shearable element.

14. A timepiece comprising the timepiece case as claimed in claim 1.

15. The timepiece case as claimed in claim 1, wherein the second component is an intermediate ring mounted between:

- a main bezel ring or a lower bezel ring, and
- a decorative ring and/or a display ring of the bezel.

16. The timepiece case as claimed in claim 1, wherein the second component is positioned with minimum clearance on the first component.

17. The timepiece case as claimed in claim 1, wherein the second component or a decorative ring and/or a display ring of the bezel consists of:

- a ceramic mainly composed of zirconia, or
- a ceramic mainly composed of alumina, or
- a ceramic mainly composed of zirconium oxide or silicon nitride, or
- a ceramic mainly composed of boron carbide or aluminum nitride, or
- a composite, or
- a metal.

18. A method for assembling a timepiece case, comprising at least:

- positioning a first component of a bezel on a middle, then
- positioning an axial retaining element on the middle, then
- positioning a second component of the bezel on the first component of the bezel,
- wherein the second component has a contact surface configured to contact the axial retaining element, thereby preventing the bezel from rubbing on a seat of the middle; or
- positioning a second component of a bezel on a first component of the bezel,
- positioning an axial retaining element between the first and second components, then
- positioning an assembly formed by the first component, the second component and the retaining element on a middle,
- wherein the second component has a contact surface configured to contact the axial retaining element, thereby preventing the bezel from rubbing on a seat of the middle.

19. A timepiece case produced by applying the method as claimed in claim 18.

20. A timepiece produced by manufacturing a timepiece from a timepiece case produced by applying the method as claimed in claim 18.

* * * * *